United States Patent
Lowe et al.

(10) Patent No.: US 8,073,997 B2
(45) Date of Patent: Dec. 6, 2011

(54) SOFTWARE INSTALL AUTOMATION

(75) Inventors: Chris Lowe, Cambridgeshire (GB);
James Digby Yarlet Collier, Cambridgeshire (GB); Noel Andrew Bainbridge, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 135 days.

(21) Appl. No.: 12/406,559

(22) Filed: Mar. 18, 2009

(65) Prior Publication Data

US 2010/0174834 A1 Jul. 8, 2010

Related U.S. Application Data

(63) Continuation-in-part of application No. 11/817,052, filed as application No. PCT/GB2006/000485 on Feb. 13, 2006, now Pat. No. 7,668,986.

(30) Foreign Application Priority Data

Mar. 4, 2005 (GB) .................................. 0504567.9

(51) Int. Cl.
G06F 13/12 (2006.01)
G06F 13/00 (2006.01)
(52) U.S. Cl. ................ 710/62; 710/72; 710/2; 710/313; 710/105; 719/321
(58) Field of Classification Search .......... 710/2, 62–64, 710/72–74, 105–106, 313; 719/320–321, 719/326–327
See application file for complete search history.

(56) References Cited

U.S. PATENT DOCUMENTS

| | | | | |
|---|---|---|---|---|
| 7,237,046 B2 * | 6/2007 | Paley et al. | ..................... | 710/38 |
| 7,584,469 B2 * | 9/2009 | Mitekura et al. | .............. | 717/174 |
| 7,600,227 B2 * | 10/2009 | Brockway et al. | ............. | 717/176 |
| 2002/0169848 A1 * | 11/2002 | Esterman, Jr. | ................. | 709/217 |
| 2003/0046447 A1 * | 3/2003 | Kouperchliak et al. | ........ | 709/321 |
| 2004/0003150 A1 * | 1/2004 | Deguchi | .......................... | 710/62 |
| 2005/0164779 A1 * | 7/2005 | Okuniewicz | .................... | 463/25 |
| 2005/0240692 A1 * | 10/2005 | Li | ................................... | 710/62 |
| 2005/0262271 A1 * | 11/2005 | Ytterstrom | ........................ | 710/8 |
| 2005/0278461 A1 * | 12/2005 | Ohta | ................................. | 710/8 |
| 2006/0036558 A1 * | 2/2006 | Mathews | ...................... | 705/414 |
| 2006/0143326 A1 * | 6/2006 | Hauck | ............................. | 710/18 |
| 2007/0185977 A1 * | 8/2007 | Sato et al. | ..................... | 709/219 |
| 2008/0071935 A1 * | 3/2008 | Ohta | ............................... | 710/10 |

FOREIGN PATENT DOCUMENTS

WO 2004/038584 A1 5/2004
WO 2009/019466 A1 2/2009

OTHER PUBLICATIONS http://www.eco-button.com/usa/A3.10.about.htm.

* cited by examiner

*Primary Examiner* — Christopher B Shin
(74) *Attorney, Agent, or Firm* — Novak Druce DeLuca + Quigg LLP

(57) ABSTRACT

Method and peripheral device to facilitate the installation of software on a host device to allow communication between that host device and a peripheral device. On connection to a host device a peripheral device presents in a first mode. In the first mode the device identifies itself as a Human Interaction Device and transmits information to the host device to facilitate the installation of the software. Subsequently the peripheral device operates in a second mode in which it identifies itself according to its real function.

21 Claims, 3 Drawing Sheets

SOFTWARE INSTALL AUTOMATION

BACKGROUND OF THE INVENTION

This invention relates to the installation of software to enable communication between a host device and a peripheral.

When a device is connected to a computer, the computer may need to use software to communicate with the peripheral and to expose the functionality of the device to the user. The software runs on the computer and provides the means for the computer to transfer data to and from the peripheral and to activate functions of the peripheral. The software may comprise drivers and application software. For example, the driver software may provide a library of procedures that can be called by processes running on the computer in order to have the device carry out a function. The procedures can receive parameters from the calling process and form suitable signals for communication to the peripheral to have it carry out the function. The application software may provide a User Interface for some user to utilize the functionality within the peripheral In order for the software to be used on the computer it must first be installed on the computer. For drivers, this typically involves storing the software on non-volatile storage accessible to the computer, for example the computer's hard disc drive, and registering the driver software so that the computer knows that it is available and is to be used for communications with the device. For application software, this typically involves installing the software from some location on a network accessible to the computer, for example a corporate LAN or the Internet, or installing the software from some medium, for example a CD or DVD.

Installing software can be complex and can call for computing knowledge, making it a difficult task for unskilled people. Therefore, in making a peripheral device easy to use, it is important to make its software easy to install.

The software is usually installed around the time the hardware peripheral device is first attached to the computer; either before or after, depending on the precise installation procedures recommended by the manufacturer to ensure that the software installs cleanly. The software is sometimes supplied on a CD or other disc that is sold with the peripheral device in question, or sometimes downloaded from the internet. These approaches have drawbacks: software and drivers on disks are not necessarily the latest version with the fewest software defects; typing a URL from some documentation can be time consuming and error-prone;

One approach to making software easy to install is to have the computer download the software automatically from a central source. This approach is available in operating systems such as Microsoft Windows XP®. When the peripheral device is attached to the computer it provides the computer with its identity. The computer then contacts a server via the internet and attempts to locate a suitable device driver for that device. If a suitable driver is located then the computer downloads and registers it. This approach has a number of disadvantages. First, it only works if the server is correctly configured with the appropriate drivers. Second, it only works if the computer has access to the central server; thus if the computer is not connected to a network then it cannot access the drivers. Third, users may have concerns over security if they are to download the drivers from a source they had not themselves specified.

Operating systems typically support some standard interface protocols, drivers and applications for communicating with peripheral devices of standard types. For example, operating systems can typically support a standard protocol for communicating with a mass storage device such as a disc drive over a USB interface. However, standard protocols and applications are not generally suitable for communicating with non-standard devices.

One approach for improving the installation of drivers and software is to use a USB composite device, as outlined in WO 2004/038584. This approach has several disadvantages, most significantly a race condition between the USB manifestations of the mass storage device and of the custom USB device. This approach also leaves an additional drive installed on the host computer, which may be confusing to users. A further system is described in US patent publication number 2008/0195768. In that system a device presents itself as two different devices. Initially on connection the device presents as a USB storage device which stores the required software, and subsequently the device presents as the actual device having the true functionality of that device once the software has been installed and/or verified. However, this requires the device to have a USB bulk-transfer endpoint and implement a FAT file system or similar.

There is therefore scope for an improved means of installing drivers and/or executable files for interacting with a peripheral device.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a first aspect there is provided process for the installation of software for a peripheral device on a host device, the method being performed by the peripheral device and comprising the following steps: on connection to a host device, transmitting information to the host device identifying the peripheral device as a Human Interaction Device (HID); transmitting a key press sequence to the host device to cause the host device to perform steps for the installation of software on the host device; and transmitting information to the host device identifying the peripheral device according to its real function.

The steps for installation may comprise automatically opening a web-address specified in the key press sequence.

The software may include driver software and/or application software.

The driver software may include a specific driver for the peripheral device in HID mode.

The peripheral device maybe connected to the host device using the USB protocol.

The device's identification information may comprise a Vendor ID and a Device ID.

The peripheral device may transmit a different Device ID and/or Vendor ID when in HID Mode and Real Mode.

The peripheral device may logically disconnect from the host device before identifying itself according to its real function.

According to a second aspect there is provided process for the installation of software for a peripheral device on a host device, the method being performed by the host device and comprising the steps of: detecting connection of the peripheral device to the host device; receiving information from the peripheral device indicating that it is a Human Interface Device and configuring the host device to receive key press information from the peripheral device; receiving a key press sequence from the peripheral device and placing that key press sequence in the keyboard buffer for processing, the key press sequence causing the host device to perform steps to help the host's user download and install driver and application software on the host device to enable communication between the host device and the peripheral device; permitting the host's user to run the downloaded software to install the driver and application software; receiving information from the peripheral device identifying it according to its real function; and registering the software on the host device to allow communication with the peripheral device operating according to its real function.

The host device may open a web-page, archive file or installer specified in the key press sequence, in response to the key press sequence.

The software may also be for use when the peripheral device is operating as a Human Interaction device.

The peripheral device maybe connected to the host device by the USB protocol.

The identification information may comprise a Vendor ID and a Device ID.

The host device may receive a different Device ID and/or Vendor ID when the peripheral device is in the Human Interaction Mode and the Real Mode.

The process may further comprise the step of transmitting a detach command after installing the software.

The key press sequence may cause the host to obtain and install the software.

The peripheral device may comprise a processor, configured to cause the peripheral device to perform the steps of the method.

According to third aspect there is provided peripheral device for connection to a host device, comprising an interface for connection to a host device, wherein the peripheral device is configured to operate in a first and a second mode, in the first mode the peripheral device identifies itself to a host device to which it is connected as a Human Interface Device and transmits key press information to the host device via the interface to facilitate the installation of software on the host device, and in the second mode the peripheral device identifies itself to a host device to which it is connected as a device providing the real functions of the peripheral, and the peripheral device is configured so that on connection of the interface to a host device it operates in the first mode and so that it subsequently operates in the second mode.

The peripheral device may further comprise a processor to control the mode of the device.

The device may be assigned a first device class, Vendor Identity and Product Identity corresponding to the first mode and identifying the device as a Human Interaction Device and a second device class, Vendor Identity and Product Identity corresponding to the second mode and identifying the device according to its real function.

The peripheral device maybe configured to transmit an identity corresponding to the first mode on connection to a host device.

The peripheral device may be configured to change from the first mode to the second mode in response to a signal from a host device to which it is connected.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
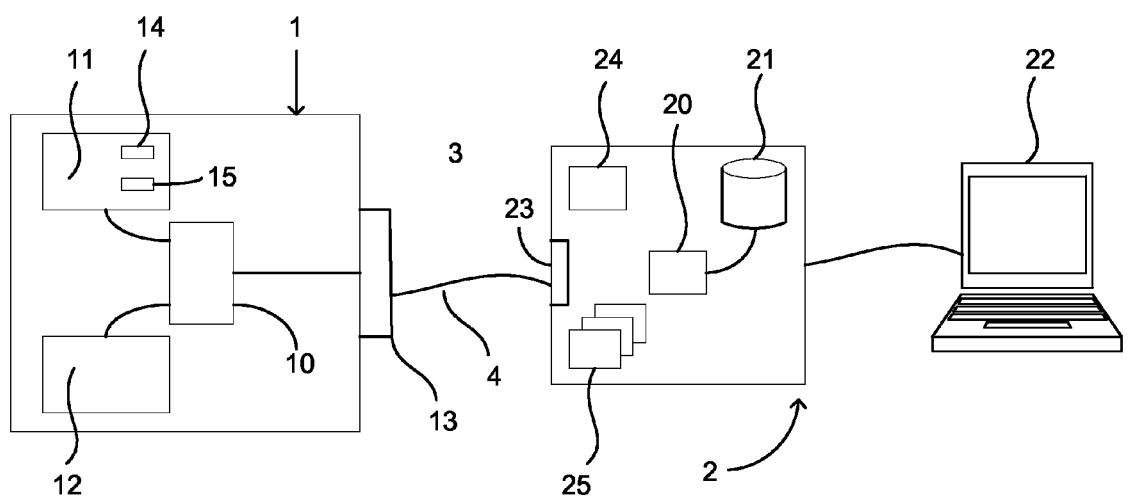
FIG. 1 shows a schematic figure of a computer and a peripheral device.

Common reference numerals are used throughout the figures to indicate similar features.

DETAILED DESCRIPTION OF THE INVENTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows a peripheral device 1 and a computer 2 connected by an interface 3. The peripheral device could be any kind of peripheral; for example a Bluetooth device, an printer, a scanner, a medical device, a camera, a joystick, a network card, a display, etc. The computer 2 could be a personal computer or could be a device that incorporates computer functionality such as a games console, a set-top box, a toy, a domestic appliance or a car.

The peripheral device 1 comprises a processor 10, a non-volatile memory 11, a functional subsystem 12 and an interface connector 13. The non-volatile memory 11 stores data including program code 14 for execution by the processor 10. The program code defines the functionality of the device for communication with an attached computer. The non-volatile memory could be implemented on an integrated circuit. The functional subsystem 12 provides the specific functionality of the device. The peripheral device could receive its electrical power from the computer via interface 3, or it could have its own mains or battery power supply.

The computer 2 has a processor 20, a non-volatile memory 21, a user interface 22 and a device interface connector 23. The computer supports an operating system 24 and a number of application programs 25. The non-volatile memory 21 could be implemented as a hard disc. The non-volatile memory 21 stores program code that defines the operating system and the application programs, which are executed by the processor 20. The user interface 22 provides a means for a user to interact with the computer. The device interface connector 23 allows peripheral devices such as device 1 to be connected to the computer 2 for communication with it.

In the present example the interface 3 is a USB interface. The interface connectors 13 and 23 are USB-type connectors which are interconnected by a cable 4. Alternatively they could be connected directly together.

The normal procedure for instantiation of a USB driver on a host device is as follows:

1. A USB device is connected to and appears on the USB bus.
2. A specific driver for the USB bus itself then queries the USB device for the device class and the VID (Vendor IDentifier)+PID (Product IDentifier).
3. The operating system of the host device looks through the drivers available to it for a driver that is indicated as being suitable for serving the detected VID and PID pair. If it finds one, it goes to step 5.

4. The operating system looks through the drivers available to it for a driver that is indicated as being suitable for serving the detected device class. If it finds no such device then it fails to instantiate any driver.

5. The operating system instantiates the appropriate device driver as found in step 3 or 4.

6. The USB device and the host device communicate with each other by means of the instantiated driver.

In order to implement the processes described below, the peripheral device is configured to present itself in two different modes. In a first mode the device presents as a Human Interface Device (HID), with a specific Vendor Identifier (VID) and Product Identifier (PID). The PID is specific to the first mode of the device. The second mode is the 'Real' mode of the peripheral device and in this mode the device provides its true functionality. In the second mode the peripheral device presents with a device class appropriate to the real function of the device and with appropriate VID and PID codes. After, the VID of the two modes will be the same. The processor 10 of the peripheral device determines the mode in which the peripheral device presents itself, as explained below.

Figure 2:
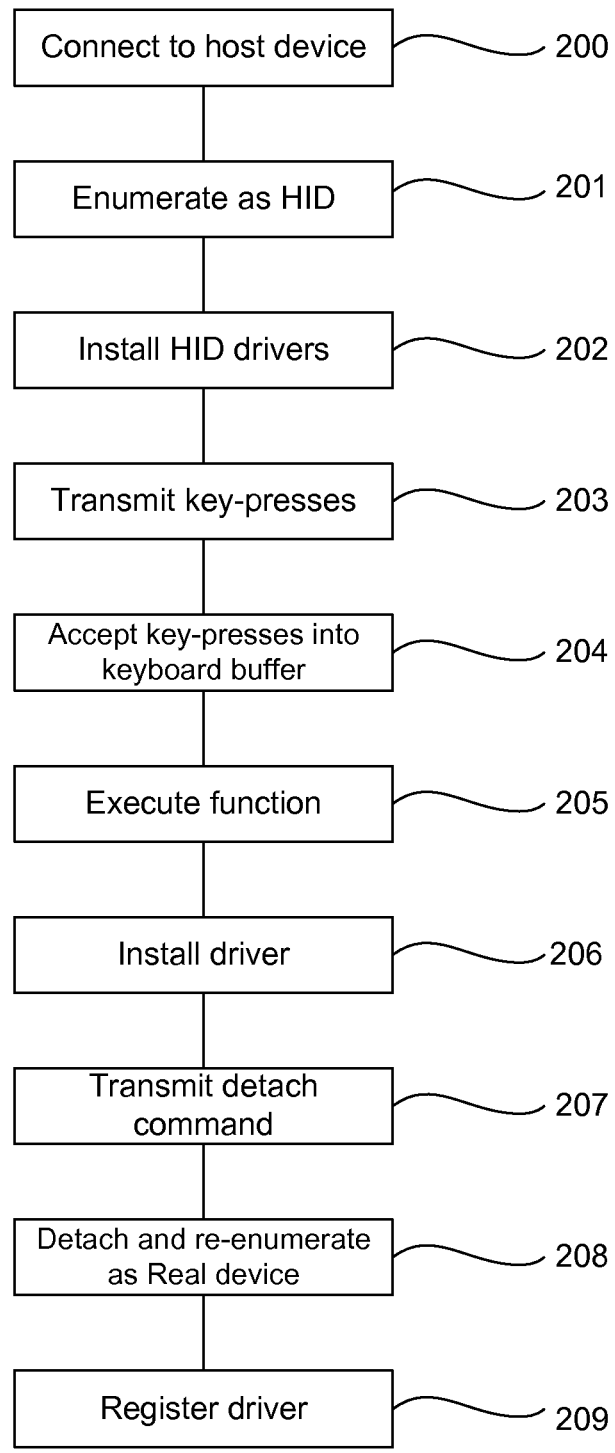
FIG. 2 shows a flow-chart of a process occurring on installation of a peripheral device.

FIG. 2 shows a flow-chart of a process for installing drivers for a peripheral device in a system such as that shown in FIG. 1.

At block 200 a user connects a USB device to a computer. At block 201 that USB device enumerates in its first mode on the USB bus as a HID with a specific VID and PID. As explained above, the PID is specific to the first mode of the USB device.

The computer installs, or configures, the appropriate HID drivers at block 202 such that HID reports will be placed in the keyboard buffer of the computer.

At block 203 the USB device transmits a key press sequence as a HID report and at block 204 that key press sequence is accepted into the computer's keyboard buffer and treated according to the configuration of the computer. The key press sequence may be stored in the non-volatile memory 11 of the device, and may be transmitted by the processor 10.

The key press sequence is defined to cause the computer to execute (block 205) instructions contained in the sequence to access driver software for the device. For example, the key press sequence may be defined to open a web-page on the computer which allows the user to download the driver. Alternatively, the sequence may directly access and run the driver software. For example, in the case of a computer running Microsoft Windows® the key press sequence may be "Windows Key+R", "<URL>", "Return key". This key sequence causes Windows® to run a web-browser to open the URL. The URL is defined as that of the driver's web-page, archive file or installer.

If the particular operating system does not allow the automatic running of a web-browser, or the automatic installation of the driver, the key press sequence could cause information to be displayed to the user on how to access the driver.

At block 206 software is installed following the execution of the key press sequence. For example, the software may be installed by the user following instructions on the web-page opened by the sequence, or the software may be installed automatically. The software includes two types of device driver; one for the device operating in its first mode, identified by the device's VID and PID in that mode, and one for the device in its second mode, identified by the VID (may be the same as in HID mode) and PID of that mode.

The software downloaded or executed following the key press sequence may be the drivers themselves, or may be executable software to manage the installation of the driver software and application software in a user-friendly manner. The use of an executable may be preferable as it may allow other commands to be executed in a convenient manner dependent on the successful completion of the installation.

At block 207 the computer transmits a detach command to the peripheral device to cause it to detach from the USB bus and to re-enumerate on the USB bus in its second mode with the appropriate VID and PID (block 208). In response to the re-enumeration, at block 209, the computer registers the appropriate driver, as installed at block 206, and the computer is thus configured to communicate with the peripheral in its second (Real) mode using the appropriate driver software for the device. The detach and re-enumeration is performed by the processor 10 in the peripheral device. In an alternative process, the processor 10 of the peripheral device could be configured to automatically detach and re-enumerate the device after, or a predetermined time after, transmission of the key press sequence.

The method described in relation to FIG. 2 provides a convenient method of installing driver software for a USB device. The driver software does not need to be distributed with the device and therefore can be centrally maintained and updated. Furthermore, by design of the web-page or files opened by the device, the installation can be very easy to perform for unskilled users. The dual-mode operation of the device is largely invisible to the user since the HID mode is only used during installation and does not remain connected once the device is in real mode.

Figure 3:
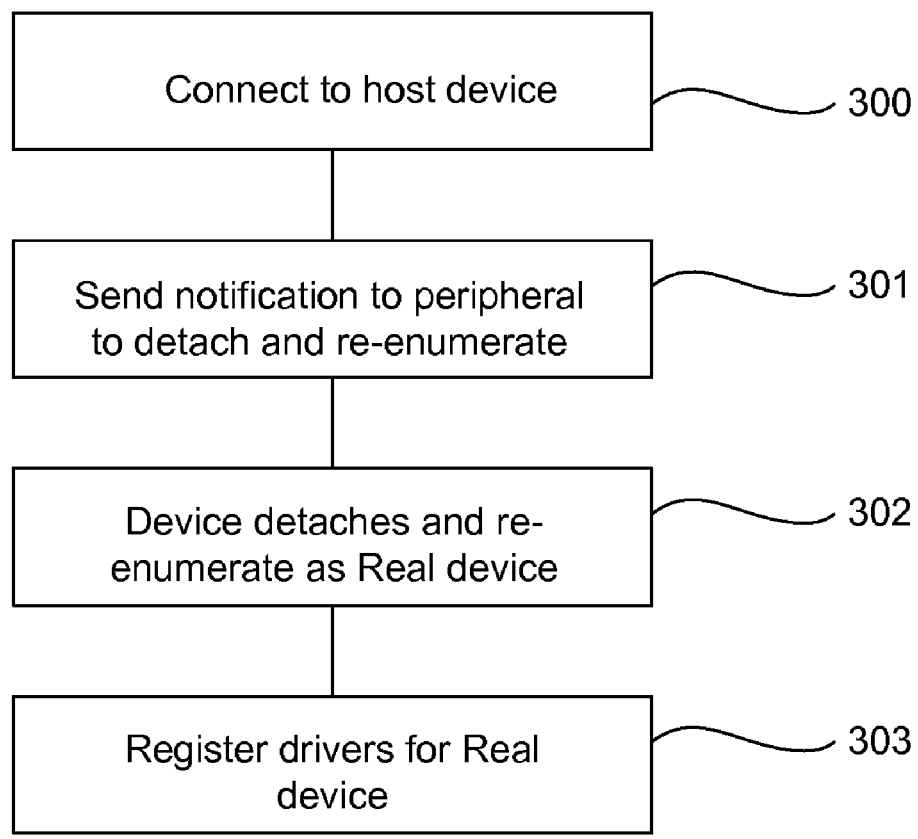
FIG. 3 shows a flow-chart of a process occurring following re-insertion of a peripheral device.

FIG. 3 shows a flow-chart of a process occurring when the peripheral device is re-inserted following successful installation of the driver software.

At block 300 the peripheral is inserted into the computer and enumerates on the USB bus in its HID mode with appropriate VID and PID. Since a driver for this particular VID and PID was installed during the initial installation process the computer registers those drivers. In order to prevent the device again transmitting the commands to cause the computer to obtain driver software the installed software may be configured not to trigger the transmission of those commands by the peripheral. This is possible because on the second and subsequent times the peripheral is connected the specific software, identified by the VID & PID of the peripheral in HID mode is registered rather than the generic software that is registered on the first connection and causes the peripheral to transmit the commands. Alternatively the driver may be configured such that the commands sent by the peripheral are not placed into the keyboard buffer.

Those drivers, at block 301, send HID notifications to the device causing it to detach and re-enumerate in its second (Rea)l mode. At block 302 the device detaches and re-enumerates in the second (Real) mode. At block 303 the computer registers the drivers for the device in the second (Real) mode which were installed during initial installation, as identified by the VID and PID supplied by the device when it enumerates in that mode. The device is then ready for use. This process avoids duplication of the initial installation process.

The processor in the peripheral device provides the peripheral device with the functionality to enable it to enumerate in two different modes, to transmit the key press sequence, and to detach and re-enumerate in a new mode.

In the system shown in FIG. 1, the processor 10 and non-volatile memory 11 are separate to the functional subsystem 12, but as will be appreciated by the skilled person the processes described above are equally applicable to other configurations of device. For example, the processor 10, non-volatile memory 11 and subsystem 12 may be combined in a single system.

In the above examples, VID and PID parameters have been used to identify the device and its different modes, but any suitable method for providing an identifier to the computer may be utilized.

Examples of devices that could operate as described above are a USB dongle that provides a means for streaming video or that interfaces with VOIP software on the host, a USB thermometer, USB joystick or a USB mouse.

The above description has been given in relation to the USB standard, and specific examples have been given in relation to the processes associated with that standard. As will be appreciated the processes described herein are equally applicable to other interfaces that support the necessary functionality.

The above description has been given in relation to the connection of a peripheral device to a computer, but as will be appreciated the processes are equally applicable to other host devices, for example portable computing devices, cars with processing systems, or any device with an interface for connecting a peripheral.

The above description has described methods and apparatus which cause the host to perform actions by placing key pressure in the keyboard buffer. In alternative embodiments other input means may be used for example, mouse inputs.

A combination of the method and apparatus described above, and the prior method utilizing a mass storage device could also be implemented. For example, the device could initially attempt to cause the computer to obtain the driver as described herein via a network connection, and if that failed, for example, due to a lack of a network connection, the device could cause the driver software to be installed from storage on the device once it has re-enumerated as a mass storage device.

The use of the term 'processor' is not intended to imply any particular features or processing capability of that component, but is intended to encompass any device that can provide appropriate functionality. Microprocessors, discrete logic devices or programmable logic arrays may all be appropriate.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise and exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A process for the installation of software on a host device, the software comprising host device executable code, the method being performed by a peripheral device and comprising the steps of:

upon initial connection of said peripheral device to a host device, transmitting information from the peripheral device to the host device identifying the peripheral device as a Human Interaction Device (HID), subsequent to the identification of said peripheral device as a HID, transmitting from the peripheral device a key press sequence to the host device, said key press sequence corresponding to a command to cause the host device to perform steps for the installation of said software on the host device, wherein said software enables communication between the host device and the peripheral device with respect to a function of the peripheral device as other than a HID, and subsequent to the installation of said software on the host device, transmitting information to the host device identifying the peripheral device according to the peripheral device's real function, such that thereafter the peripheral device is able to communicate with the host device according to its real function other than a HID.

2. A process according to claim 1, wherein the steps for installation comprise automatically opening a web-address specified in the key press sequence.

3. A process according to claim 1, wherein the software includes a specific driver for the peripheral device when the peripheral device is identified as a HID.

4. A process according to claim 1, wherein the peripheral device is connected to the host device using the USB protocol.

5. A process according to claim 4, wherein the identification information comprises a Vendor ID and a Device ID.

6. A process according to claim 5, wherein the peripheral device transmits a different Device ID and/or Vendor ID when identified as a HID and according to the peripheral device's real function.

7. A process according to claim 1, wherein the peripheral device logically disconnects from the host device before identifying itself according to the peripheral device's real function.

8. A process for the installation of software on a host device, the software comprising host device executable code that enables the host device to communicate with a peripheral device, the method being performed by the host device and comprising the steps of:

detecting an initial connection of the peripheral device to the host device, receiving information from the peripheral device indicating that the peripheral device is a Human Interaction Device (HID) and configuring the host device to receive key press information from the peripheral device as an HID, receiving a key press sequence from the peripheral device as a HID and placing that key press sequence in a keyboard buffer for processing, the key press sequence causing the host device to perform steps for the installation of driver software on the host device to enable communication between the host device and the peripheral device with respect to a function of the peripheral device as other than a HID, installing the software, subsequent to installation of the software, receiving information from the peripheral device identifying the peripheral device according to the peripheral device's real function, and registering the software on the host device to allow communication with the peripheral device operating according to the peripheral device's real function other than a HID.

9. A process according to claim 8, wherein the host device opens a web-page, archive file or installer specified in the key press sequence, in response to the key press sequence.

10. A process according to claim 8 wherein the software is also for use when the peripheral device is identified as a Human Interaction device.

11. A process according to claim 8, wherein the peripheral device is connected to the host device by the USB protocol.

12. A process according to claim 11 wherein the identification information comprises a Vendor ID and a Device ID.

13. A process according to claim 11 wherein the host device receives a different Device ID and/or Vendor ID when the peripheral device is identified as a HID and as the peripheral device's real function.

14. A process according to claim 11 further comprising the step of transmitting a detach command after installing the driver software.

15. A process according to claim 8 wherein the key press sequence causes the host to obtain and install the software.

16. A process according to claim 1 wherein the peripheral device comprises a processor, configured to cause the peripheral device to perform the steps of the method.

17. A peripheral device for connection to a host device, comprising:

an interface for connection to a host device, wherein the peripheral device is configured to operate in a first and a second mode, in the first mode the peripheral device identifies itself to a host device to which the peripheral device is connected as a Human Interface Device (HID) and transmits key press information to the host device via the interface to facilitate the installation of software on the host device, where the software enables communication between the host device and the peripheral device with respect to a function of the peripheral device other than a HID, and in the second mode the peripheral device identifies itself to a host device to which the peripheral device is connected as a device providing the real functions of the peripheral other than a HID, and the peripheral device is configured so that on initial connection of the interface to a host device the peripheral device operates in the first mode and so that the peripheral device subsequently operates in the second mode.

18. A peripheral device according to claim 17, further comprising a processor to control the mode of the device.

19. A peripheral device according to claim 18, wherein the device is assigned a first device class, Vendor Identity and Product Identity corresponding to the first mode and identifying the device as a Human Interaction Device and a second device class, Vendor Identity and Product Identity corresponding to the second mode and identifying the device according to the peripheral device's real function.

20. A peripheral device according to claim 17 configured to transmit an identity corresponding to the first mode on connection to a host device.

21. A peripheral device according to claim 17 configured to change from the first mode to the second mode in response to a signal from a host device to which the peripheral device is connected.

* * * * *